No. 864,983. PATENTED SEPT. 3, 1907.
L. P. McKINNEY.
SPARE TIRE HOLDER FOR AUTOMOBILES.
APPLICATION FILED MAY 14, 1906.

WITNESSES
Farnum F. Dorsey
E. C. Wurdeman

INVENTOR
Leo P. McKinney
by his Attorneys
Phillips Van Evera & Fish

UNITED STATES PATENT OFFICE.

LEO P. McKINNEY, OF BOSTON, MASSACHUSETTS, ASSIGNOR OF ONE-HALF TO JOHN L. SNOW, OF BOSTON, MASSACHUSETTS.

SPARE-TIRE HOLDER FOR AUTOMOBILES.

No. 864,983. Specification of Letters Patent. Patented Sept. 3, 1907.

Application filed May 14, 1906. Serial No. 316,663.

*To all whom it may concern:*

Be it known that I, LEO P. MCKINNEY, a citizen of the United States, residing at Boston, in the county of Suffolk and State of Massachusetts, have invented certain new and useful Improvements in Spare-Tire Holders for Automobiles; and I do hereby declare the following to be a full, clear, and exact description of the invention, such as will enable others skilled in the art to which it appertains to make and use the same.

The present invention relates to improvements in spare-tire holders for automobiles.

It is customary to carry one or more spare pneumatic tires or tire shoes on automobiles, and for this purpose fixtures or holders of suitable form are frequently secured to the body of an automobile, usually at one side, to hold a tire or shoe in a convenient and accessible position.

The present invention relates to devices of this character, and its object is to produce a holder which may be readily removed from the automobile when not in use, and as readily replaced when required, and which, when in use, will be securely fastened and prevented from rattling or coming loose.

The invention consists in the improved spare-tire holder hereinafter described, as defined in the claims.

Figure 1:
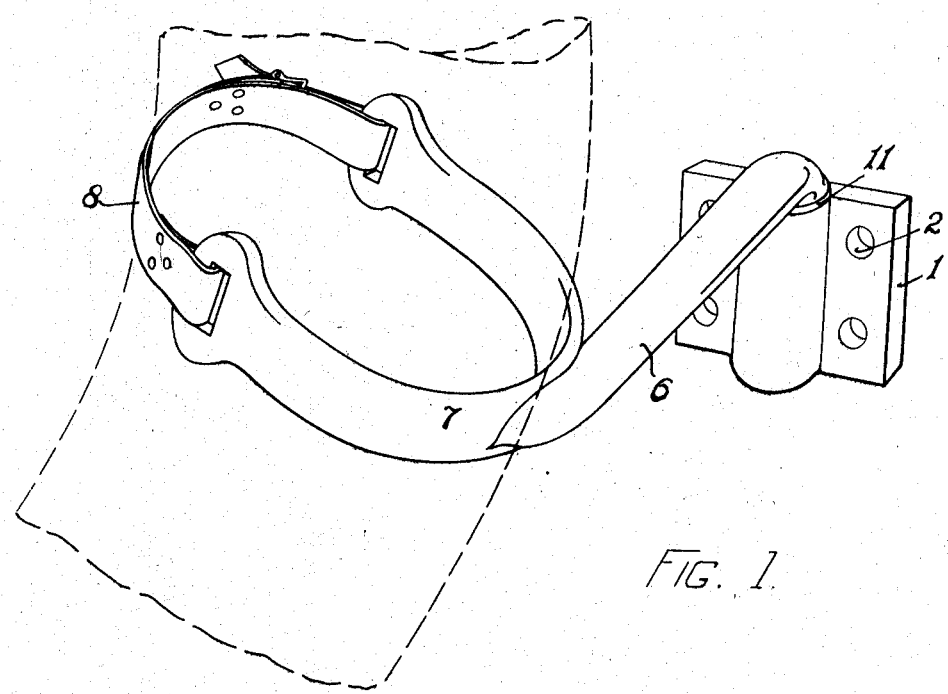
Figure 2:
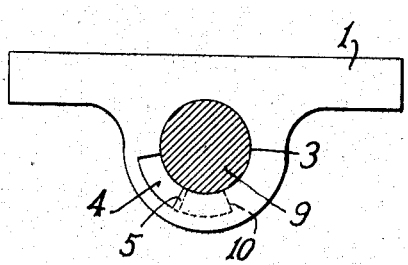
Figure 3:
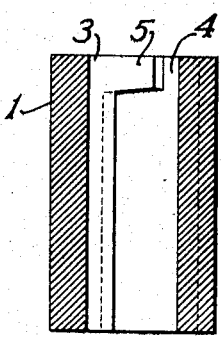
Figure 4:
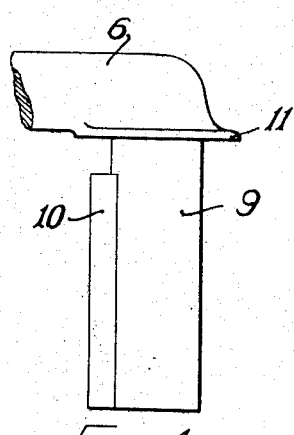

In the drawings Figure 1 is a perspective view of a holder embodying the present invention. Fig. 2 is a plan view of the base with the shank in section. Fig. 3 is a vertical section of the base looking from the rear. Fig. 4 is a side elevation of the shank.

A single holder is shown in the drawings, although it will be understood that such holders are to be used in pairs, in the usual manner, the tire being inserted between the holders in an upright position and being secured to them at diametrically opposite points.

The illustrated embodiment of the invention comprises a base which is secured permanently to the body of the automobile and a bracket removably secured thereto and provided with means for engaging and securing the tire, and the novelty of the device resides in the manner in which these parts are secured together, this being accomplished by a joint so arranged that the parts may be readily unlocked by a movement of the bracket, and the bracket removed from the base, when there is no tire in the holders, while such unlocking is prevented, when the device is in use, by the presence of the tire, and the parts are then securely locked together, while looseness and rattling at the joint is prevented by the peculiar form of the interlocking members, as will be presently described.

The base 1 is provided with screw holes 2 for securing it to the automobile, and with a vertical socket 3 having a general cylindrical form but provided with a lateral recess 4 (see Figs. 2 & 3). At the top of the socket the recess 4 is narrowed so as to leave a lip 5 overhanging a portion of the recess. The bracket 6 is provided with a crotch 7 for the reception of the tire, and with a strap 8 to secure the tire in place. The bracket is secured to the base by a shank 9 conforming in shape to the socket 3 and provided with a key 10 which projects into the recess 4. The shank is inserted with the bracket swung to the left so as to permit the key to enter the recess at the left of the lip 5, and the bracket is then swung to the right into the position of Fig. 1 so that the top of the key is engaged by the lip and the shank is held securely in the socket. The tire is then put in place, as shown by dotted lines, Fig. 1, and so long as the tire is in place the bracket is prevented, by its engagement therewith, from swinging to the left and becoming unlocked. The lower surface of the lip 5, as shown in Fig. 3, is inclined so that as the key passes under it, in locking the bracket in place, a wedging action occurs, and whereas the key enters easily under the lip it is finally pinched and all lost motion is prevented, so that the bracket cannot rattle when in use. The key is made of considerable length, and engages the vertical wall of the recess, when the bracket is in use, so as to prevent the bracket swinging too far to the right under the strains encountered in its use with a heavy tire. The upper end of the shank is provided with a flange 11 which conceals the socket and provides a neat finish to the device.

The above-described construction results in a spare-tire holder which operates, when in use, substantially like a permanent fixture, being perfectly secure and free from rattling, but which may be instantly unlocked, when not in use, without the use of tools of any kind, so that it may be removed, with the exception of the base plate, which is small and projects only slightly from the body of the automobile.

By the bayonet-joint construction above described the use of set screws, nuts, or other loose part is entirely avoided, the device comprising but two pieces, of which one is secured permanently to the automobile.

The construction of the tire-securing device on the bracket of the illustrated embodiment of the invention is not an essential feature of the invention, and the holder as a whole may be used in various positions other than that shown in the drawings. The invention is not, in general, limited to the specific details of construction and operation above described, but may be embodied in other forms broadly defined in the claims.

Having now described the invention, what is claimed is:—

1. A spare-tire holder for automobiles, having, in combination, a base, and a bracket secured thereto by a bayonet-joint and provided with means for holding a tire, the bayonet-joint including two interlocking engaging surfaces of which one is inclined so as to have a wedging action and to take up lost motion between the parts when the joint is locked, substantially as described.

2. A spare-tire holder for automobiles, having, in combination, a base provided with a vertical socket comprising a cylindrical portion and a lateral recess, and with a lip overhanging a portion of the lateral recess, and a bracket provided with means for holding a tire and with a stem for engaging said socket and provided with a vertical key for engaging the lateral recess and interlocking with the lip, substantially as described.

3. A spare-tire holder for automobiles having, in combination, a base and a bracket secured together by a bayonet joint, the bracket being provided with a crotch for engaging and holding a tire and the bayonet joint being arranged to unlock by a movement of the bracket in the direction of the crotch, substantially as described.

4. A spare tire holder for automobiles adapted in co-operation with a device of similar or other suitable character to hold a spare tire on an automobile and comprising in combination a base and a bracket secured together by a bayonet joint, the bracket being provided with a crotch for engaging and holding a tire and a bayonet joint arranged to unlock by a movement of the bracket in the direction of the crotch, substantially as described.

In testimony whereof I affix my signature, in presence of two witnesses.

LEO P. McKINNEY.

Witnesses:
JOHN L. SNOW,
FARNUM F. DORSEY.